United States Patent
Nagareda (10) Patent No.: US 12,461,216 B2
(45) Date of Patent: Nov. 4, 2025

(54) ULTRASONIC-WAVE TRANSMITTER/RECEIVER

(71) Applicant: HONDA ELECTRONICS CO., LTD., Aichi (JP)

(72) Inventor: Kenji Nagareda, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 18/872,626

(22) PCT Filed: Jul. 12, 2023

(86) PCT No.: PCT/JP2023/025666
§ 371 (c)(1),
(2) Date: Dec. 6, 2024

(87) PCT Pub. No.: WO2025/013231
PCT Pub. Date: Jan. 16, 2025

(65) Prior Publication Data
US 2025/0172676 A1    May 29, 2025

(51) Int. Cl.
*G01S 7/521* (2006.01)
*G01S 15/96* (2006.01)

(52) U.S. Cl.
CPC .............. *G01S 7/521* (2013.01); *G01S 15/96* (2013.01)

(58) Field of Classification Search
CPC .................................. G01S 7/521; G01S 15/96
USPC .......................................................... 367/93
See application file for complete search history.

(56) References Cited

U.S. PATENT DOCUMENTS

| 5,546,362 A | * | 8/1996 | Baumann ................. G01S 7/521 367/173 |
| 5,887,376 A | * | 3/1999 | Currier .................... G01S 15/96 367/173 |
| D959,303 S | * | 8/2022 | Nagareda ....................... D10/65 |
| 2006/0050615 A1 | * | 3/2006 | Swisher .................. G01S 7/521 367/173 |

(Continued)

FOREIGN PATENT DOCUMENTS

| CN | 113815784 A | 12/2021 |
| JP | 2014-196067 A | 10/2014 |

(Continued)

*Primary Examiner* — Naomi J Small
(74) *Attorney, Agent, or Firm* — Millen, White, Zelano & Branigan, P.C.; Christopher W. Brody (57) ABSTRACT

An ultrasonic-wave transmitter/receiver is provided that can achieve a structure with stabilized underwater orientation and improved detection accuracy at a low cost. The ultrasonic-wave transmitter/receiver of the present invention includes an ultrasonic transducer for transmitting and receiving ultrasonic waves, a bell-shaped case that houses the ultrasonic transducer, and a cable for suspending the case. The ultrasonic transducer is cylindrical and positioned at the center of the bottom of the case. In the gap between the inner peripheral surface of the case and the outer peripheral surface of the ultrasonic transducer, a weight is positioned to surround the ultrasonic transducer, such that its center of gravity is aligned with the center of the case. The gap in the lower region within the case is filled with a filler A1, which also fixes the weight in place within the case.

5 Claims, 6 Drawing Sheets

(56) References Cited

U.S. PATENT DOCUMENTS

2022/0291365 A1\* 9/2022 Nagareda ............. G10K 11/205
2023/0123597 A1\* 4/2023 Nagareda ................ G01S 7/521
　　　　　　　　　　　　　　　　　　　367/107

FOREIGN PATENT DOCUMENTS

JP　　　2018-179512 A　　11/2018
JP　　　　　6991613 B2　　12/2021

\* cited by examiner

ULTRASONIC-WAVE TRANSMITTER/RECEIVER

TECHNICAL FIELD

The present invention relates to an ultrasonic-wave transmitter/receiver for fish finders, which uses ultrasonic waves to detect schools of fish.

BACKGROUND ART

Conventionally, an ultrasonic-wave transmitter/receiver is known that performs fish detection by transmitting and receiving ultrasonic waves through an ultrasonic transducer housed within a case, which is suspended underwater using a signal transmission cable (see, for example, Patent Document 1). This ultrasonic-wave transmitter/receiver is used, for example, in ice fishing, such as for smelt fishing. The case of the ultrasonic-wave transmitter/receiver is inserted into the water through a hole drilled in the ice during ice fishing.

PRIOR ART DOCUMENTS

Patent Documents

Patent Document 1: Japanese Patent No. 6991613

DISCLOSURE OF THE INVENTION

Problems to be Solved by the Invention

To improve the detection accuracy of an ultrasonic-wave transmitter/receiver, it is preferable to align the acoustic radiation surface of the ultrasonic transducer horizontally so that the ultrasonic waves are irradiated (transmitted) vertically downward. Conventionally, the acoustic radiation surface has been leveled by the weight of the transducer itself. However, if there is a significant deviation between the center of the case and the center of gravity of the ultrasonic transducer, the transmitter/receiver tilts underwater, causing the acoustic radiation surface to incline. As a result, the direction of the ultrasonic waves (the acoustic pressure center axis) deviates by a few degrees from the vertical direction. In such a case, accurate detection of fish schools becomes difficult, leading to display errors on the fish finder. Therefore, it is necessary to adjust the center of gravity to ensure that the ultrasonic transducer faces directly downward when the case is suspended.

The directional characteristics of the ultrasonic transducer are determined by the resonant frequency and the diameter of the acoustic-radiation surface. The present applicant aims to offer a lineup of ultrasonic-wave transmitter/receivers equipped with ultrasonic transducers featuring various directional and frequency characteristics. However, if these devices are realized using the structure described in Patent Document 1, it would be necessary to prepare cases with different inner diameters corresponding to the sizes of the ultrasonic transducers. As a result, there is a problem of increased manufacturing costs for the ultrasonic-wave transmitter/receiver.

The present invention has been made in view of the above issues, and its objective is to provide an ultrasonic-wave transmitter/receiver with a structure that maintains an orientation (balanced state) underwater to prevent tilting and ensure accurate detection, while being realized at low cost.

Means for Solving the Problem

To solve the above problems, the first aspect of the present invention refers to an ultrasonic-wave transmitter/receiver for a fish finder, comprising: an ultrasonic transducer for transmitting and receiving ultrasonic waves; a bell-shaped case that houses the ultrasonic transducer; and a cable for suspending the case, wherein a cylindrical ultrasonic transducer is positioned at the central bottom part of the case, wherein a weight is arranged in the gap between the inner peripheral surface of the case and the outer peripheral surface of the ultrasonic transducer to surround the ultrasonic transducer and align its center of gravity with the center of the case, wherein the gap in the lower region of the case is filled with a filler, and the weight is fixed to the case by the filler.

Therefore, according to the first aspect of the present invention, the ultrasonic transducer is positioned at the central bottom part of the case, and a weight is arranged to surround the ultrasonic transducer and align its center of gravity with the center of the case. As a result, the device becomes less prone to swaying when suspended by the cable, stabilizing the orientation (balanced state) of the ultrasonic-wave transmitter/receiver underwater. Consequently, the acoustic-radiation surface of the ultrasonic transducer remains horizontal, allowing the ultrasonic waves to be transmitted vertically downward, thereby improving the detection accuracy of the ultrasonic-wave transmitter/receiver. In addition, the weight is arranged in the gap between the inner peripheral surface of the case and the outer peripheral surface of the ultrasonic transducer to surround the transducer. This configuration ensures that, even if the outer diameter of the ultrasonic transducer is significantly smaller than the inner diameter of the case, the transducer is positioned at the center of the case by the weight. Thus, it is unnecessary to prepare cases with different inner diameters according to the size of the ultrasonic transducer, enabling the use of a standardized case. Therefore, the structure stabilizes the orientation (balanced state) of the ultrasonic-wave transmitter/receiver underwater and improves detection accuracy while being realized at low cost.

The second aspect of the present invention refers to the ultrasonic-wave transmitter/receiver for a fish finder according to the first aspect of the present invention, wherein the weight is a ring-shaped weight.

Therefore, according to the second aspect of the present invention, the ultrasonic transducer, which is surrounded by a ring-shaped weight, can be easily positioned at the central bottom part of the case. Additionally, since the weight is a ring-shaped weight, it possesses rotational symmetry, making it easier to align the center of gravity of the weight with the center of the case, thereby reducing the likelihood of the ultrasonic-wave transmitter/receiver tilting. As a result, the orientation (balanced state) of the ultrasonic-wave transmitter/receiver can be easily stabilized underwater, and the acoustic-radiation surface of the ultrasonic transducer can remain horizontal, thereby readily improving the detection accuracy of the ultrasonic-wave transmitter/receiver.

The third aspect of the present invention refers to the ultrasonic-wave transmitter/receiver for a fish finder according to the second aspect of the present invention, wherein the upper surface of the weight is positioned lower than the upper end surface of the ultrasonic transducer.

Therefore, according to the third aspect of the present invention, since the weight is positioned lower than the ultrasonic transducer, it becomes easier to lower the center of gravity of the ultrasonic-wave transmitter/receiver. As a result, the orientation (balanced state) of the ultrasonic-wave transmitter/receiver is reliably stabilized underwater, ensuring that the acoustic-radiation surface of the ultrasonic transducer remains horizontal, thereby enabling the ultrasonic waves to be transmitted reliably and precisely in a vertically downward direction.

The fourth aspect of the present invention refers to the ultrasonic-wave transmitter/receiver for a fish finder according to the third aspect of the present invention, wherein the ultrasonic transducer is composed of a substrate, which also serves as an acoustic matching layer and has a relatively large diameter, and a piezoelectric element, which is bonded to the substrate and has a relatively small diameter, and wherein the weight is arranged in contact with the substrate but in a non-contact state with the piezoelectric element.

Therefore, according to the fourth aspect of the present invention, since the weight is arranged in a non-contact state with the piezoelectric element, the vibration of the piezoelectric element is not impeded by the weight. This allows the sensitivity of the piezoelectric element to be enhanced. Additionally, since the weight is arranged in contact with the substrate, the ultrasonic transducer can be securely held at the center of the case by the weight. As a result, the orientation (balanced state) of the ultrasonic-wave transmitter/receiver can be readily stabilized underwater, and the acoustic-radiation surface of the ultrasonic transducer remains horizontal, thereby readily improving the detection accuracy of the ultrasonic-wave transmitter/receiver.

The fifth aspect of the present invention refers to the ultrasonic-wave transmitter/receiver for a fish finder according to the fourth aspect of the present invention, wherein the weight has a specific gravity equal to or greater than that of the piezoelectric element.

Therefore, according to the fifth aspect of the present invention, since the specific gravity of the weight is greater, the ultrasonic-wave transmitter/receiver becomes easier to submerge in water, making it easier to stabilize its orientation (balanced state) underwater.

The sixth aspect of the present invention refers to the ultrasonic-wave transmitter/receiver for a fish finder according to any one of the first to fifth aspects of the present invention, wherein the filler is a cured product of a flowable resin.

Therefore, according to the sixth aspect of the present invention, since the filler is flowable, it can be reliably filled into the gap formed between the inner peripheral surface of the case and the outer peripheral surface of the ultrasonic transducer. As a result, once the filler cures, the weight can be fixed to the case. Additionally, the weight and the ultrasonic transducer surrounded by the weight can also be secured through the filler filled into the gap.

The seventh aspect of the present invention refers to the ultrasonic-wave transmitter/receiver for a fish finder according to any one of the first to fifth aspects of the present invention, comprising: the case having an upper case, which is open at its lower end and gradually decreases in outer diameter toward the upper end, and a lower case, which is open at its upper end and has a concave cross-section formed integrally by a bottom and side walls, wherein the ultrasonic transducer and the weight are housed in the lower case, wherein the upper surface of the filler is positioned above both the joint interface between the lower case and the upper case and the upper end surface of the ultrasonic transducer, wherein a cavity is left in the region above the filler.

Therefore, according to the seventh aspect of the present invention, the internal space of the lower case is filled with the ultrasonic transducer and the weight. Accordingly, with a sufficient amount of filler to fill the internal space of the upper case, the filler not only fills the entire internal space of the lower case but also fills at least a part of the internal space of the upper case. As a result, once the filler cures, the lower case and the upper case can be firmly bonded together. Moreover, since the weight is housed in the lower case, there is no need to place the weight in the upper case, leaving space in the upper case for components such as transformers, coils, and resistors. Additionally, with a cavity remaining above the filler inside the case, the center of gravity of the ultrasonic-wave transmitter/receiver can be lowered, further stabilizing its orientation (balanced state) underwater. Furthermore, since the upper surface of the filler is positioned above the joint interface between the lower case and the upper case, the joint interface is covered by the filler inside the case. As a result, water ingress into the case through the joint interface is prevented by the filler, thereby improving the waterproof performance of the case.

Effect of the Invention

As described in detail above, according to the first to seventh aspects of the present invention, it is possible to achieve a structure that stabilizes the orientation (balanced state) of the ultrasonic-wave transmitter/receiver underwater and improves detection accuracy at low cost.

MODES FOR CARRYING OUT THE INVENTION

Hereinafter, an embodiment embodying the present invention will be described in detail with reference to the drawings.

Figure 1:
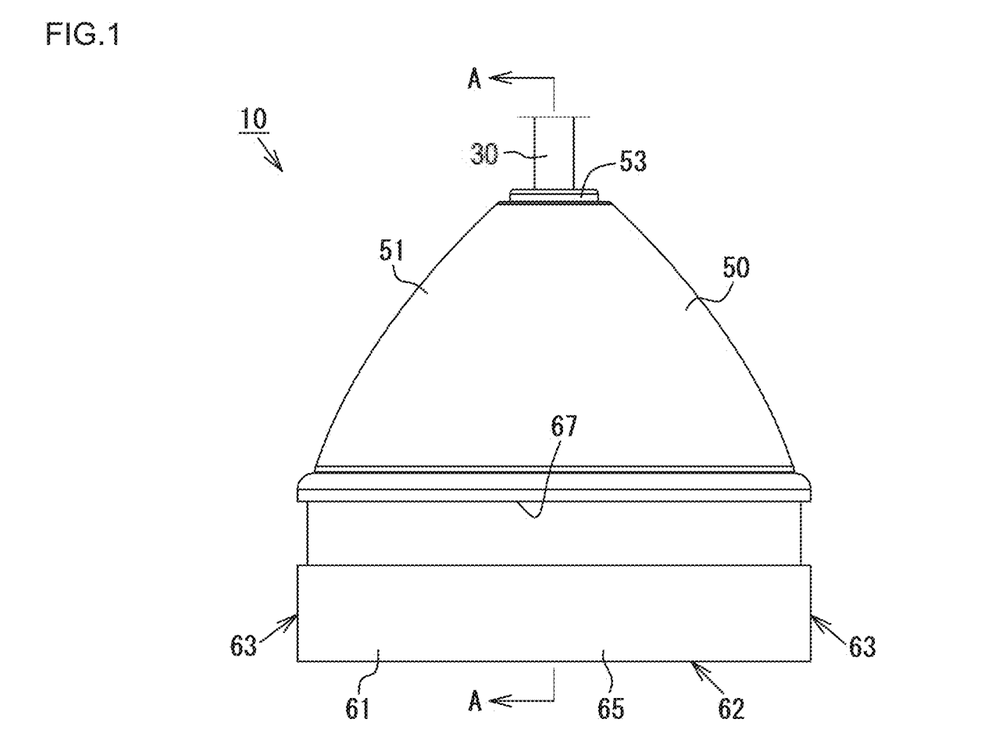
FIG. 1 is a side view showing the ultrasonic-wave transmitter/receiver according to the present embodiment.
Figure 2:
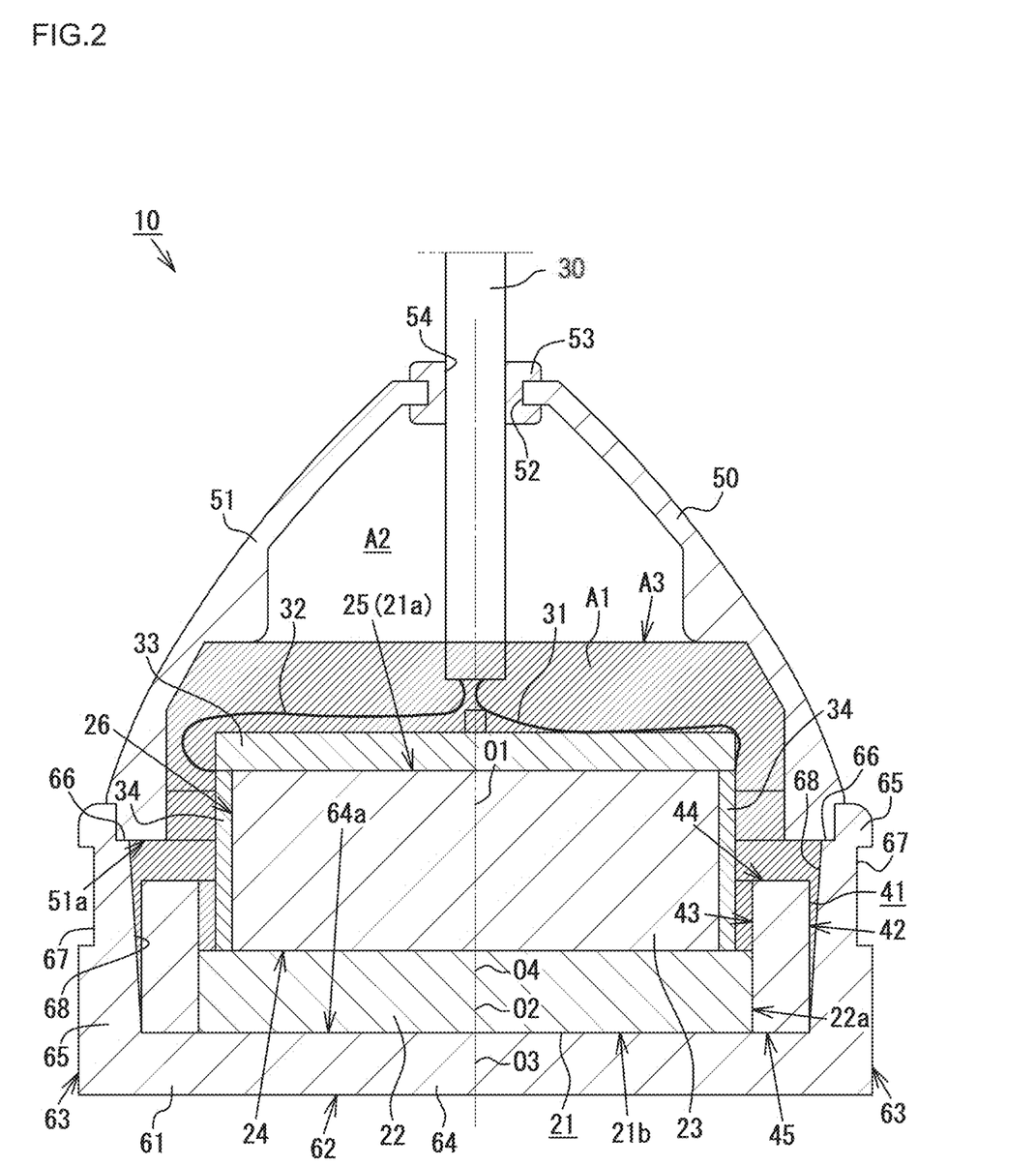
FIG. 2 is a cross-sectional view along line A-A of FIG. 1.

As shown in FIGS. 1 and 2, the ultrasonic-wave transmitter/receiver 10 of the present embodiment is a device for a fish finder that detects schools of fish present underwater by emitting ultrasonic waves into the water. The ultrasonic-wave transmitter/receiver 10 comprises an ultrasonic transducer 21 for transmitting and receiving ultrasonic waves, a bell-shaped case 50 that houses the ultrasonic transducer 21, and a cable 30 for suspending the case 50. In regular use, the ultrasonic-wave transmitter/receiver 10 of the present embodiment is used in a state of being suspended by the cable 30.

Figure 3:
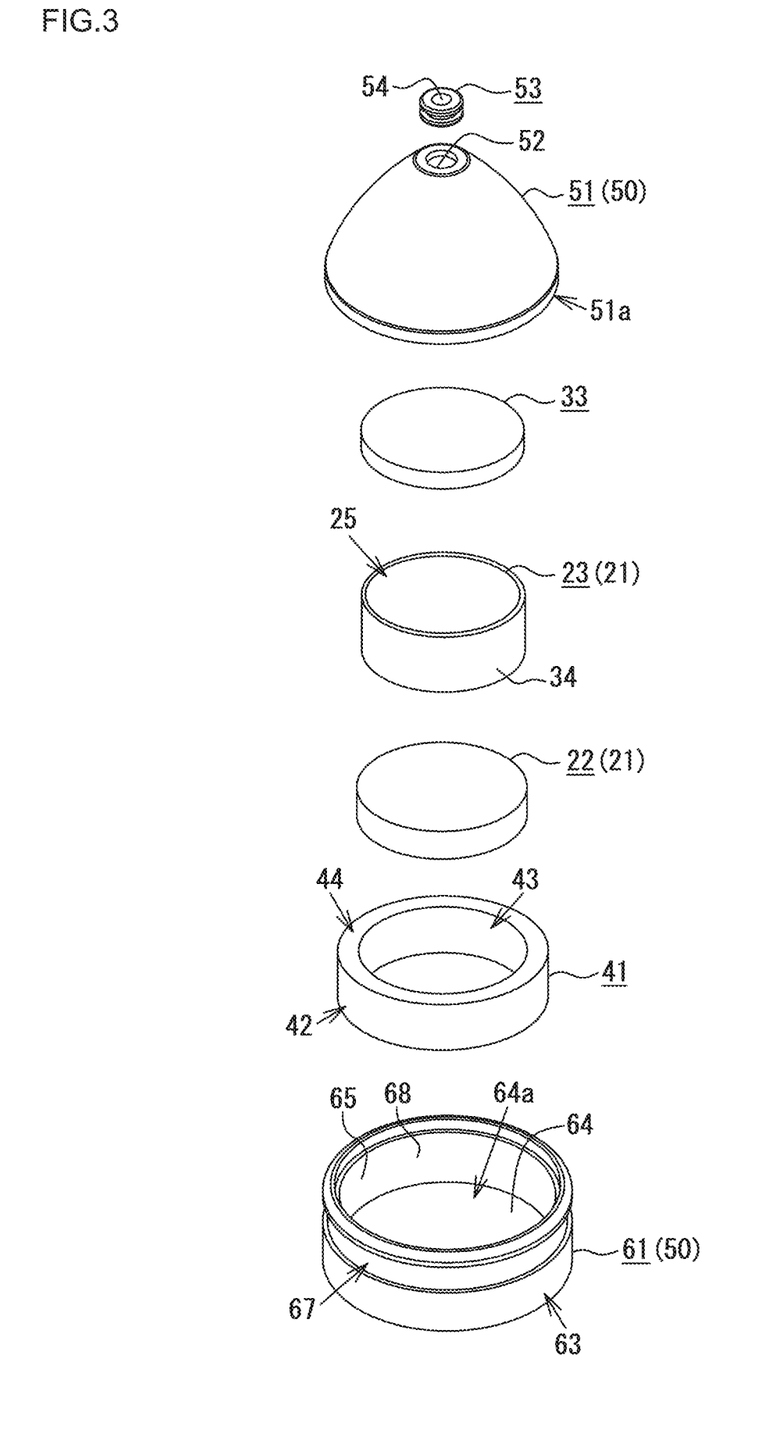
FIG. 3 is an exploded perspective view showing the ultrasonic-wave transmitter/receiver.

As shown in FIGS. 1 to 3, the case 50 comprises an upper case 51, which forms the upper half of the case 50, and a lower case 61, which forms the lower half of the case 50. The upper case 51 is open at its lower end 51*a* and has a shape that gradually decreases in outer diameter toward the upper end. The upper case 51 is formed using a resin material, such as ABS resin (acrylonitrile-butadiene-styrene resin) or PC resin (polycarbonate resin), which is resistant to deformation due to its low elasticity. Furthermore, a through-hole 52 is provided at the upper end of the upper case 51, in which a bushing 53 made of chloroprene rubber or neoprene rubber is fitted. The bushing 53 is annular with a wiring insertion hole 54 at its center and functions to secure the cable 30 inserted through the wiring insertion hole 54.

As shown in FIGS. 1 to 3, the lower case 61 is made of an elastic material that also serves as an acoustic matching layer, such as chloroprene rubber, neoprene rubber, or polyurethane, and includes a bottom surface 62 and an outer peripheral surface 63 that is perpendicular to the bottom surface 62. The lower case 61 is a bottomed cylindrical case with an opening at the upper end, formed with a concave cross-section by integrally forming the bottom 64 and side wall 65. The lower end portion of the upper case 51 is fitted inside the lower case 61. Additionally, a stepped surface 66 is formed at the upper end opening of the lower case 61 to abut the open end (lower end 51*a*) of the upper case 51 that is fitted inside the lower case 61.

Additionally, a groove 67 is formed on the outer peripheral surface 63 of the side wall 65 of the lower case 61. The groove 67 is designed for an alternative usage mode different from typical use, specifically for fitting fastening members, such as U-bolts or cable ties (not shown), when the ultrasonic-wave transmitter/receiver 10 is mounted on a boat (not shown). The fastening member secures the ultrasonic-wave transmitter/receiver 10 to a holder (not shown), and the holder is attached to the stern of the boat.

As shown in FIG. 2, the inner peripheral surface 68 of the lower case 61 has a shape with an inner diameter that gradually decreases toward the bottom 64. The ultrasonic transducer 21 is housed on the side of the lower case 61 of the case 50. Specifically, the ultrasonic transducer 21 is positioned at the center of the bottom 64 of the lower case 61. The ultrasonic transducer 21 is generally cylindrical and comprises a relatively large-diameter substrate 22, which also serves as an acoustic matching layer, and a relatively small-diameter piezoelectric element 23 bonded to the substrate 22. The amount of misalignment between the central axis O1 of the piezoelectric element 23 and the central axis O2 of the substrate 22 is 2% or less of the outer diameter of the substrate 22 (0% in this embodiment). Additionally, the amount of misalignment between the central axis O3 of the lower case 61 and the central axis O2 of the substrate 22 is 2% or less of the outer diameter of the lower case 61 (0% in this embodiment).

The substrate 22 is a disc-shaped resin plate made from materials such as glass epoxy (FR-4) or glass fiber reinforced plastic (GFRP). The piezoelectric element 23 is a cylindrical ceramic plate made from, for example, lead zirconate titanate (PZT), which is a piezoelectric ceramic. The piezoelectric element 23 has a front surface 24 and a rear surface 25 on the opposite side of the front surface 24. Furthermore, a front-side electrode (not shown) is formed on the front surface 24 of the piezoelectric element 23, and a rear-side electrode (not shown) is formed on the rear surface 25 of the piezoelectric element 23. In this embodiment, the entire front surface 24 of the piezoelectric element 23 is bonded to the substrate 22 via the front-side electrode and an adhesive layer (not shown). The front surface 24, which is bonded to the substrate 22, functions as an acoustic radiation surface for emitting (transmitting) ultrasonic waves when the piezoelectric element 23 vibrates.

As shown in FIG. 2, of the two wires included in the cable 30, one wire 31 is connected to the front-side electrode, and the other wire 32 is connected to the rear-side electrode. The wire 31 is connected to a side terminal (not shown) extending outward from the front-side electrode by soldering or other means. The wire 32 is connected to the outer peripheral part of the rear-side electrode by soldering or other means. The cable 30 is drawn out of the case 50 through the wiring insertion hole 54 provided at the upper part of the case 50.

As shown in FIGS. 2 and 3, a sheet-like sound-absorbing material 33 (backing material) is attached to the rear surface 25 side of the piezoelectric element 23. The sound-absorbing material 33 absorbs sound on the rear surface 25 side to reduce reverberation. Additionally, a sound-absorbing material 34 (side material) is wrapped around the outer peripheral surface 26 of the piezoelectric element 23. The sound-absorbing material 34 absorbs sound on the outer peripheral surface 26 to reduce reverberation. The sound-absorbing materials 33 and 34 can be made of materials such as a resin or rubber that contain particles or fibers made of metal or ceramics, or a resin material with dispersed pores (such as sponge).

Additionally, a weight 41 is housed on the side of the lower case 61 of the case 50. The weight 41 is positioned in the gap formed between the inner peripheral surface 68 of the lower case 61 (case 50) and the outer peripheral surface of the ultrasonic transducer 21. The weight 41 is arranged such that its center of gravity is located at the center of the lower case 61 (case 50). Thus, the weight 41 functions to submerge the case 50 in water and to adjust the center of gravity to prevent the case 50 from tilting when suspended by the cable 30. In this embodiment, the weight 41 is a ring-shaped weight. The weight 41 has an outer peripheral surface 42 positioned on the side of the inner peripheral surface 68 of the lower case 61 and an inner peripheral surface 43 positioned on the side of the outer peripheral surface of the ultrasonic transducer 21, forming an annular member that surrounds the ultrasonic transducer 21 from the outer peripheral side. The outer diameter of the weight 41 is equal to the inner diameter at the lower end of the inner peripheral surface 68 of the lower case 61. The inner diameter of the weight 41 is slightly larger than the outer diameter of the piezoelectric element 23 and is equal to the outer diameter of the substrate 22. As a result, the inner peripheral surface 43 of the weight 41 is positioned in a state where it is not in contact with the outer peripheral surface 26 of the piezoelectric element 23 but is in surface contact with the outer peripheral surface 22*a* of the substrate 22. The amount of misalignment between the central axis O4 of the weight 41 and the central axis O1 of the piezoelectric element 23 is 2% or less of the outer diameter of the piezoelectric element 23 (0% in this embodiment). The upper surface 44 of the weight 41 is located lower than the upper end surface 21*a* of the ultrasonic transducer 21 by a level that is between one-third and two-thirds of the height of the ultrasonic transducer 21. Meanwhile, the lower surface 45 of the weight 41 is positioned at the same height as the lower end surface 21*b* of the ultrasonic transducer 21.

The weight 41 is made of a material with a specific gravity of 7 or higher, such as zinc (specific gravity 7.14), iron (specific gravity 7.85), or lead (specific gravity 11.34). In other words, the weight 41 has a specific gravity equal to or greater than that of the piezoelectric element 23 (7.7 in this embodiment).

In the case 50 shown in FIG. 2, a filler A1 made of a resin material (such as epoxy resin, urethane resin, or silicone resin) or adhesive (such as a two-part curing type epoxy adhesive or rubber-based adhesive) is filled. The filler A1 is a cured product of a flowable resin. The upper surface A3 of the filler A1 is positioned above the joint interface between the lower case 61 and the upper case 51, as well as above the upper end surface 21a of the ultrasonic transducer 21. Consequently, a cavity A2 remains in the region above the filler A1. Additionally, part of the filler A1 fills gaps in the lower region of the case 50, such as the gap between the inner peripheral surface 68 of the lower case 61 and the outer peripheral surface 42 of the weight 41, or the gap between the outer peripheral surface of the ultrasonic transducer 21 and the inner peripheral surface 43 of the weight 41. As a result, the filler A1 secures the weight 41 in place within the case 50.

Figure 4:
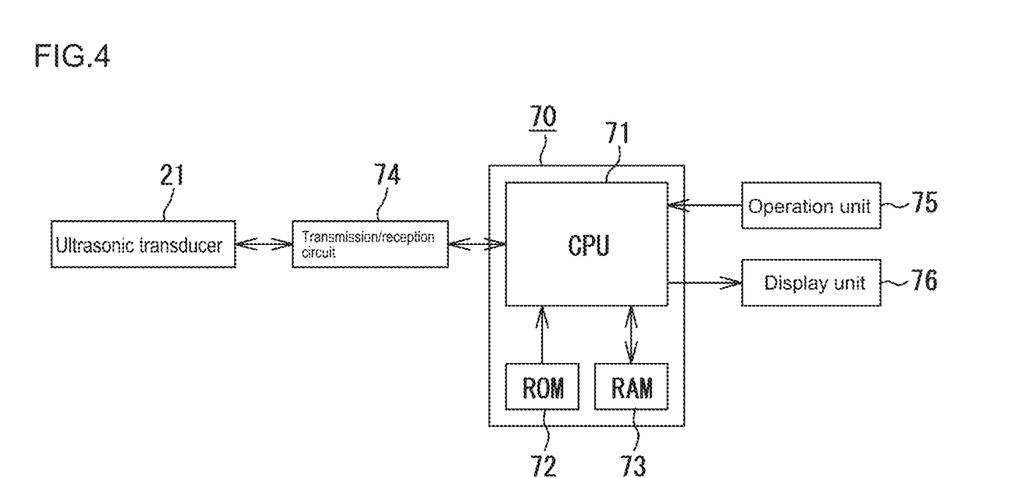
FIG. 4 is a block diagram showing the electrical configuration of the ultrasonic-wave transmitter/receiver.

Next, the electrical configuration of the ultrasonic-wave transmitter/receiver 10 will be described.

As shown in FIG. 4, the LCD monitor of the ultrasonic-wave transmitter/receiver 10 (not shown) includes a control device 70 that integrally controls the entire device. The control device 70 is composed of a known computer, including a CPU 71, ROM 72, and RAM 73.

The CPU 71 is electrically connected to the ultrasonic transducer 21 via a transmission/reception circuit 74. The transmission/reception circuit 74 outputs an oscillation signal to the ultrasonic transducer 21 to drive it, causing the ultrasonic transducer 21 to emit (transmit) ultrasonic waves toward the water. Additionally, an electrical signal representing the ultrasonic waves (reflected waves) received by the ultrasonic transducer 21 is input to the transmission/reception circuit 74. Furthermore, the CPU 71 is electrically connected to both an operation unit 75 and a display unit 76 of the LCD monitor.

The CPU 71, as shown in FIG. 4, controls the transmission/reception circuit 74 to cause the ultrasonic transducer 21 to emit ultrasonic waves. Additionally, the CPU 71 receives a reception signal, which is generated when the ultrasonic transducer 21 receives a reflected wave, via the transmission/reception circuit 74. Based on the received reception signal, the CPU 71 generates detection image data and stores the generated detection image data in the RAM 73. Furthermore, the CPU 71 controls the display of the detection image on the display unit 76 based on the detection image data stored in the RAM 73.

Next, the method of using the ultrasonic-wave transmitter/receiver 10 will be described.

The ultrasonic-wave transmitter/receiver 10 of the present embodiment is used for ice fishing, such as smelt fishing. In ice fishing, the case 50, which houses the ultrasonic transducer 21, is suspended underwater using the cable 30. Fish detection is then performed by transmitting and receiving ultrasonic waves with the ultrasonic transducer 21. Specifically, first, the power (not shown) of the ultrasonic-wave transmitter/receiver 10 and the LCD monitor is turned on. The LCD monitor is used, for example, while being held by the operator. Next, the CPU 71 of the control device 70 controls the transmission/reception circuit 74 to output an oscillation signal to the ultrasonic transducer 21 via the cable 30, driving the ultrasonic transducer 21. At this time, the piezoelectric element 23 repeatedly contracts and expands in the thickness direction. As a result, the piezoelectric element 23 vibrates, and ultrasonic waves are emitted (transmitted) from the ultrasonic transducer 21 into the water. When the ultrasonic waves reach a school of fish or the lake bottom, they are reflected by the fish or lake bottom as reflected waves, which propagate back toward the ultrasonic-wave transmitter/receiver 10 and are received by the ultrasonic transducer 21. Subsequently, the ultrasonic waves (reflected waves) received by the ultrasonic transducer 21 are converted into a reception signal and input to the CPU 71 via the cable 30 and the transmission/reception circuit 74. The CPU 71 then converts the amplitude and timing (time) information of the reception signal obtained from this series of transmissions and receptions into an image, which is displayed on the display unit 76.

Next, the manufacturing method for the ultrasonic-wave transmitter/receiver 10 will be described.

First, the substrate 22 is prepared. Specifically, a resin plate made of, for example, glass epoxy (FR-4) is cut into a circular shape. Additionally, a ceramic plate, which will become the piezoelectric element 23, is prepared. Specifically, a disc-shaped ceramic sintered body made of lead zirconate titanate (PZT) is fabricated, and then surface polishing is performed to obtain the ceramic plate. Next, a front-side electrode is formed on the front surface 24 of the ceramic plate, and a rear-side electrode is formed on the rear surface 25. Specifically, silver paste is applied to both the front surface 24 and rear surface 25 of the ceramic plate, and the applied silver paste is baked to form the front-side and rear-side electrodes. Then, a polarization process is performed by applying a voltage between the front-side electrode and the rear-side electrode, polarizing the ceramic plate in the thickness direction.

Next, the ceramic plate is bonded to one surface of the substrate 22 via the front-side electrode. Specifically, adhesive (such as epoxy adhesive), which serves as the adhesive layer, is applied to either the surface of the front-side electrode or the surface of the substrate 22, and the ceramic plate is bonded and fixed to the substrate 22. At this point, the ultrasonic transducer 21 is complete. Alternatively, brazing using solder or similar material may be performed instead of applying adhesive.

After the ultrasonic transducer 21 is completed, the wire 31 is connected to the front-side electrode via a side terminal (not shown) by soldering or similar means, and the wire 32 is connected to the rear-side electrode by soldering or similar means. Next, sound-absorbing material 34 for reducing reverberation is wrapped around the outer peripheral surface 26 of the piezoelectric element 23, and sound-absorbing material 33, also for reducing reverberation, is attached to the rear surface 25 side of the piezoelectric element 23.

Subsequently, the ultrasonic transducer 21 is housed in the lower case 61. The ultrasonic transducer 21 is positioned in the lower case 61 such that the amount of misalignment between the central axis O3 of the lower case 61 and the central axis O2 of the substrate 22 is 2% or less of the outer diameter of the lower case 61, and then it is adhered to the lower case 61. Specifically, adhesive (such as epoxy adhesive) is applied to either the inner bottom surface 64a of the lower case 61 or the rear surface (lower end surface 21b) of the substrate 22, and the ultrasonic transducer 21 is bonded and fixed to the lower case 61.

Furthermore, the weight 41 is housed in the lower case 61. Since the inner wall of the lower case 61 gradually decreases in inner diameter toward the bottom 64, the weight 41 is guided into the gap formed between the inner peripheral surface 68 and the outer peripheral surface 22a of the substrate 22 (ultrasonic transducer 21), maintaining a horizontal position due to contact with the inner peripheral surface 68. At this time, the amount of misalignment between the central axis O4 of the weight 41 and the central axis O1 of the piezoelectric element 23 is 2% or less of the outer diameter of the piezoelectric element 23.

Furthermore, filler A1 is filled into the case 50. Specifically, first, the bushing 53 is fitted into the through-hole 52 of the upper case 51. Next, with the upper case 51 inverted, the cable 30 is inserted through the wiring insertion hole 54 of the bushing 53. To prevent the cable 30 from coming loose, a knot may be tied in the cable 30, or a cable tie may be secured.

Next, liquid filler A1 is poured into the upper case 51. Then, with the lower case 61, in which the ultrasonic transducer 21 and sound-absorbing materials 33 and 34 have been adhered and wired, inverted, the lower case 61 is fitted over the upper case 51 to form the case 50. For reinforcement, adhesive (not shown) may be applied in advance to the contact areas between the upper case 51 and lower case 61. Before the filler A1 poured into the upper case 51 hardens, the case 50 is inverted so that the bottom 62 of the lower case 61 faces downward, and the case 50 is placed on a horizontal, flat surface (not shown). As a result, the filler A1 in the upper case 51 flows into the lower case 61, causing a cavity A2 to form in the upper region of the upper case 51. Furthermore, the filler A1 extends from the upper surface 44 of the weight 41 to the inner bottom surface 64a of the lower case 61 and reaches the lower end of the cable 30, so that the joint between the upper case 51 and the lower case 61 is covered by the filler A1, ensuring the sealed state of the case 50.

The case 50 is then left to stand, allowing the filler A1 to harden. Additionally, depending on the type of filler A1, heat treatment may be applied to harden the filler A1. At this stage, the weight 41 is fixed in place, and the ultrasonic-wave transmitter/receiver 10 is completed.

Accordingly, the following advantages can be obtained according to the present embodiment.

(1) In the ultrasonic-wave transmitter/receiver 10 of the present embodiment, the ultrasonic transducer 21 is positioned at the center of the bottom 64 within the lower case 61, and the weight 41 is arranged surrounding the ultrasonic transducer 21 so that its center of gravity is positioned at the center of the case 50. This makes the ultrasonic-wave transmitter/receiver 10 sufficiently heavy, reducing its sway when suspended by the cable 30 and stabilizing its underwater orientation. As a result, the front surface 24 of the piezoelectric element 23, which constitutes the ultrasonic transducer 21, becomes horizontal, allowing ultrasonic waves to be transmitted vertically downward and improving the detection accuracy of the ultrasonic-wave transmitter/receiver 10. Moreover, the weight 41 is positioned around the ultrasonic transducer 21 within the gap formed between the inner peripheral surface 68 of the lower case 61 and the outer peripheral surface of the ultrasonic transducer 21. This arrangement ensures that, even if the outer diameter of the ultrasonic transducer 21 is considerably smaller than the inner diameter of the lower case 61, the ultrasonic transducer 21 is positioned at the center of the case 50 by the weight 41. In this case, there is no need to prepare cases 50 with different inner diameters according to the size of the ultrasonic transducer 21, allowing for standardization of the case 50. Thus, a structure that stabilizes the underwater orientation of the ultrasonic-wave transmitter/receiver 10 and improves detection accuracy can be achieved at a low cost.

(2) In the present embodiment, the space within the lower case 61 is filled by the weight 41, allowing the filler A1 to fill the entirety of the lower case 61 and more than half of the upper case 51. Thus, as the filler A1 hardens, the lower case 61 and the upper case 51 can be securely bonded together.

(3) In the present embodiment, since the weight 41 is housed in the lower case 61, there is no need to place the weight 41 in the upper case 51, allowing space to be secured within the upper case 51. Therefore, components that do not significantly affect the center of gravity, such as transformers, coils, or resistors, can be stored in the space within the upper case 51. Moreover, as the weight 41 is positioned in the gap between the inner peripheral surface 68 of the lower case 61 and the outer peripheral surface of the ultrasonic transducer 21, the space (gap) formed at the bottom of the lower case 61 can be effectively utilized. Additionally, the lower case 61, which is made of an elastic material and therefore prone to deformation, can be reinforced by the rigid weight 41. This enables the protection of the ultrasonic transducer 21, which is surrounded by the weight 41.

(4) For example, if the weight were placed on the rear surface 25 of the piezoelectric element 23, the vibration of the piezoelectric element 23 might be hindered by the load of the weight. In contrast, in the present embodiment, the weight 41 is positioned without contact with the piezoelectric element 23, so the vibration of the piezoelectric element 23 is not obstructed by the weight 41. Thus, it is possible to enhance the sensitivity of the piezoelectric element 23. Although the sound-absorbing materials 33 and 34 are in contact with the piezoelectric element 23, they have a significantly lower specific gravity than the weight 41, and therefore do not hinder the vibration of the piezoelectric element 23.

(5) In the present embodiment, the weight 41 is positioned lower than the ultrasonic transducer 21, making it easier to lower the center of gravity of the ultrasonic-wave transmitter/receiver 10 compared to a case in which the weight 41 is placed on the rear surface 25 of the piezoelectric element 23. Furthermore, since a cavity A2 is left in the region above the filler A1 within the case 50, the center of gravity of the ultrasonic-wave transmitter/receiver 10 can be further lowered. As a result, the underwater orientation of the ultrasonic-wave transmitter/receiver 10 becomes even more stable, ensuring that the acoustic radiation surface of the ultrasonic transducer 21 remains horizontal. This allows the ultrasonic waves to be transmitted vertically downward, thereby reliably improving the detection accuracy of the ultrasonic-wave transmitter/receiver 10.

(6) In the present embodiment, since the lower case 61 is made of an elastic material, it can absorb impact by deforming if the ultrasonic-wave transmitter/receiver 10 is subjected to a shock upon dropping. This allows the ultrasonic-wave transmitter/receiver 10 to be protected. Additionally, because the lower case 61 is made of a deformable elastic material, fitting it together with the upper case 51 is easier.

(7) In the present embodiment, the amount of misalignment between the central axis O1 of the piezoelectric element 23 and the central axis O2 of the substrate 22 is 0%, the amount of misalignment between the central axis O1 and the central axis O4 of the weight 41 is 0%, and the amount of misalignment between the central axis O2 and the central axis O3 of the lower case 61 is 0%. In other words, since the misalignment of each central axis O1 to O4 is kept to a minimum, the center of gravity of the ultrasonic-wave transmitter/receiver 10 can be precisely aligned.

The above embodiment may be modified as follows.

In the above embodiment, the case 50 is configured by joining the upper case 51 and the lower case 61, but the case may instead be integrally formed.

In the above embodiment, the upper case 51 was joined to the lower case 61 by inserting the lower end of the upper case 51 into the interior of the lower case 61 through its upper-end opening, but other methods may also be used to join the two. For example, a screw may be inserted into a screw insertion hole provided in the upper case 51 (or lower case 61), and the tip of the inserted screw may be threaded into the lower case 61 (or upper case 51) to join the upper case 51 and lower case 61. Additionally, an adhesive may be used to join the upper case 51 and the lower case 61.

Figure 5:
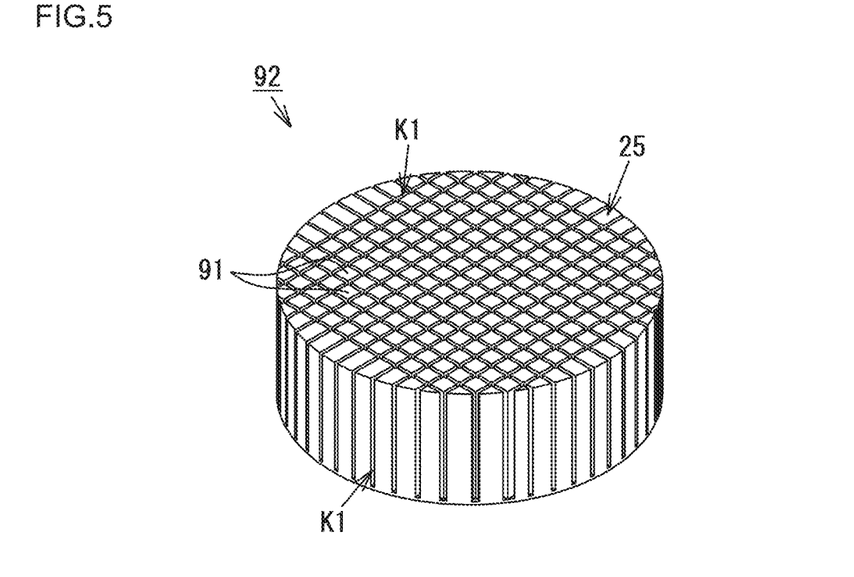
FIG. 5 is a perspective view showing the piezoelectric element in another embodiment.
Figure 6:
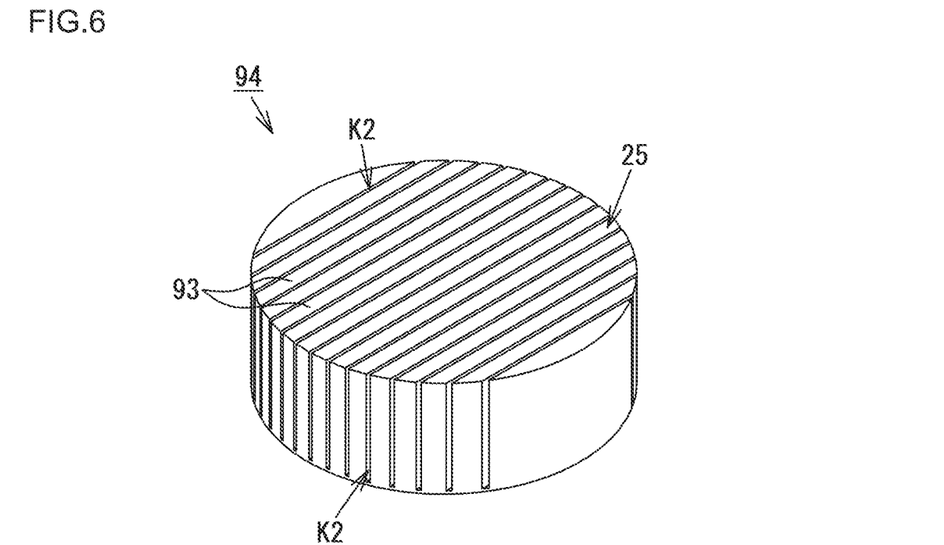
FIG. 6 is a perspective view showing the piezoelectric element in yet another embodiment.

In the above embodiment, the ultrasonic transducer 21 includes a cylindrical piezoelectric element 23. However, the ultrasonic transducer 21 may instead include a piezoelectric element divided into multiple vibrating sections by forming multiple cuts. For example, as shown in FIG. 5, the ultrasonic transducer 21 may include a 1-3 composite piezoelectric element 92, divided into multiple columnar vibrating sections 91 by forming cuts K1 extending vertically and horizontally. Additionally, as shown in FIG. 6, the ultrasonic transducer 21 may include a 2-2 composite piezoelectric element 94, divided into multiple band-shaped vibrating sections 93 by forming cuts K2 extending in a single direction.

In this configuration, each of the vibrating sections 91 and 93 can more easily deform in the thickness direction of the piezoelectric elements 92 and 94, making it easier for the piezoelectric elements 92 and 94 to deform at each section. As a result, the piezoelectric elements 92 and 94 can vibrate more easily, leading to a higher electromechanical coupling coefficient and a broader frequency bandwidth. Additionally, when forming cuts K2 extending in a single direction to create the band-shaped vibrating sections 93, the number of cuts required is halved compared to the case of forming vertically and horizontally extending cuts K1 to create the columnar vibrating sections 91, thereby simplifying the formation of cuts K2. This configuration reduces the manufacturing cost of the ultrasonic transducer 21. Furthermore, because the vibrating sections 93 are band-shaped, they become longer in the planar direction compared to the columnar vibrating sections 91. Consequently, the vibrating sections 93 have higher strength, improving the reliability of the ultrasonic transducer 21.

Furthermore, the ultrasonic transducer 21 may include a ring-shaped or rectangular piezoelectric element. Additionally, a 0-3 composite piezoelectric element made by mixing piezoelectric ceramic particles into a rubber material, or a piezoelectric element made from porous piezoelectric ceramics (a porous element), may also be used.

In the above embodiment, the substrate 22, which also serves as an acoustic matching layer, is interposed between the piezoelectric element 23 and the lower case 61. However, since the lower case 61 also functions as an acoustic matching layer, the substrate 22 may be omitted. Additionally, the substrate 22 is not limited to a single material; it may also be a multilayer matching layer composed of multiple types of materials stacked together.

Figure 7:
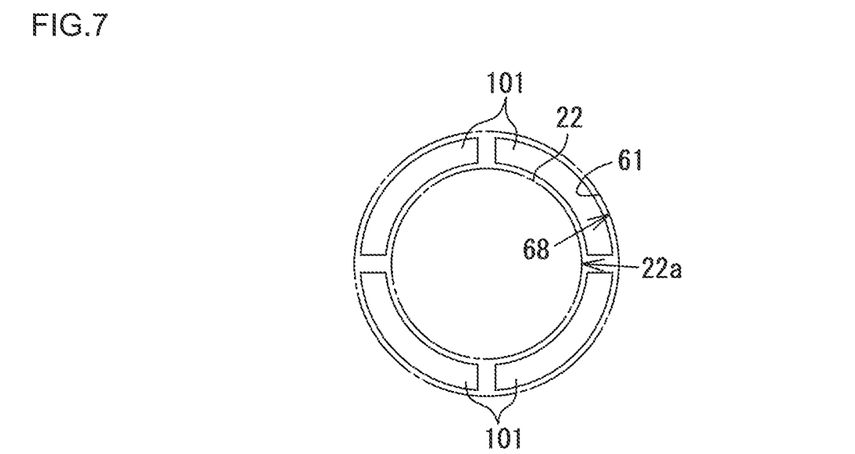
FIG. 7 is a plan view showing the arrangement of the weight in another embodiment.
Figure 8:
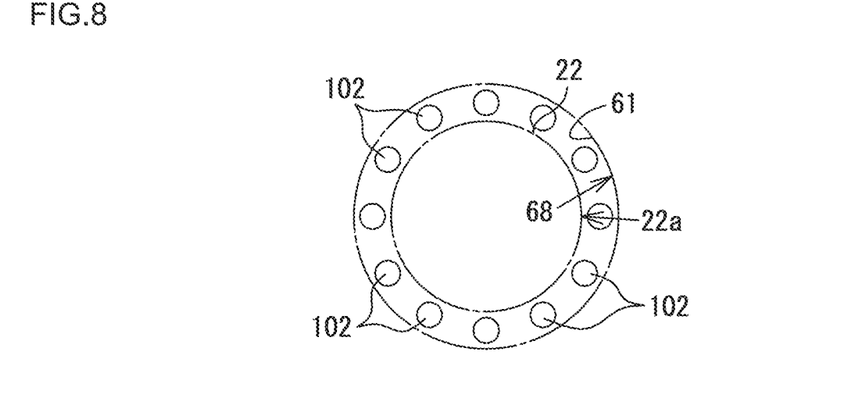
FIG. 8 is a plan view showing the arrangement of the weight in yet another embodiment.
Figure 9:
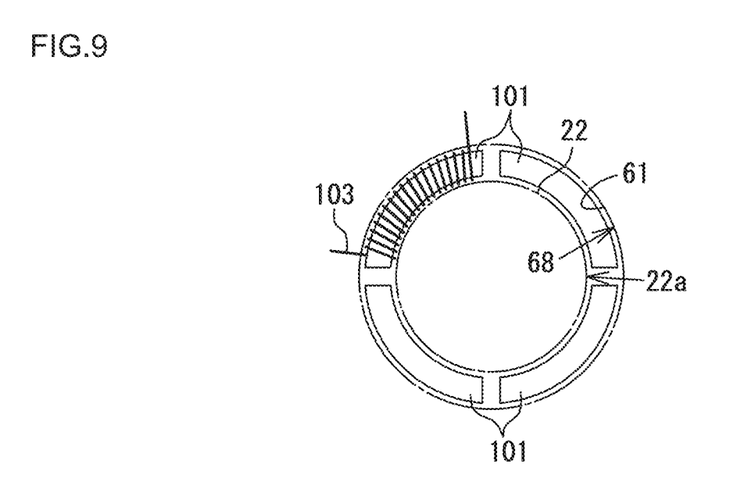
FIG. 9 is a plan view showing the arrangement of the weight in still another embodiment.

In the above embodiment, the weight 41 is ring-shaped (annular), but weights of other shapes may also be used. For example, the outer peripheral surface 42 side of the weight may be elliptical, or it may form a polygonal shape such as rectangular or hexagonal. In this case, it is preferable for the inner peripheral surface 43 of the weight 41 to form a circular shape that makes surface contact with the outer peripheral surface of the ultrasonic transducer 21 (the outer peripheral surface 22a of the substrate 22 in the above embodiment). Additionally, the entire inner peripheral surface 43 of the weight 41 does not necessarily have to make surface contact with the outer peripheral surface of the ultrasonic transducer 21 (the outer peripheral surface 22a of the substrate 22). In this configuration, an elliptical annular weight, a rectangular annular weight, or a polygonal annular weight such as a hexagonal annular weight may be used. Alternatively, multiple weights 101 formed by dividing a ring-shaped weight may be arranged within the gap between the inner peripheral surface 68 of the lower case 61 and the outer peripheral surface of the ultrasonic transducer 21 (see FIG. 7), or multiple block-shaped weights 102 may be distributed within the gap (see FIG. 8). Furthermore, at least one of the divided weights 101 may be used as a coil with winding 103 wrapped around its outer circumference (see FIG. 9). In other words, a component with significant weight, such as a coil, may also be used as a weight.

In the above embodiment, the upper surface 44 of the weight 41 is positioned lower than the upper end surface 21a of the ultrasonic transducer 21. However, the upper surface 44 of the weight 41 may be positioned at the same height as the upper end surface 21a, or it may be positioned higher than the upper end surface 21a.

In the above embodiment, the ultrasonic transducer 21 is composed of a relatively large-diameter substrate 22 and a relatively small-diameter piezoelectric element 23. However, the ultrasonic transducer 21 may also be composed of a substrate and a piezoelectric element that have the same outer diameter. In this case, the weight 41 is positioned in contact with both the outer peripheral surface of the piezoelectric element and the outer peripheral surface of the substrate. Alternatively, the ultrasonic transducer 21 may be composed of a relatively small-diameter substrate and a relatively large diameter piezoelectric element. In this case, the weight 41 is positioned in contact with the piezoelectric element and without contact with the outer peripheral surface of the substrate.

In the above embodiment, a groove 67 is formed on the outer peripheral surface 63 on the side wall 65 of the lower case 61, but the groove 67 may be omitted.

Next, in addition to the technical concepts described in the claims, the technical concepts understood from the aforementioned embodiments are listed below.

(1) The ultrasonic-wave transmitter/receiver according to the fourth aspect of the present invention, wherein the inner peripheral surface of the weight is positioned without contact with the outer peripheral surface of the piezoelectric element and in surface contact with the outer peripheral surface of the substrate.

(2) The ultrasonic-wave transmitter/receiver according to the seventh aspect of the present invention, wherein the outer diameter of the weight is equal to the inner diameter at the lower end of the inner peripheral surface of the lower case.

(3) The ultrasonic-wave transmitter/receiver according to the third aspect of the present invention, wherein the upper surface of the weight is positioned lower than the upper end surface of the ultrasonic transducer by a level that is between one-third and two-thirds of the height of the ultrasonic transducer.

(4) The ultrasonic wave transmitter/receiver according to the third aspect of the present invention, wherein the lower surface of the weight is positioned at the same height as the lower end surface of the ultrasonic transducer.

(5) The ultrasonic-wave transmitter/receiver according to the seventh aspect of the present invention, wherein the filler extends from the upper surface of the weight to the inner bottom surface of the lower case and also reaches the lower end of the cable.

DESCRIPTION OF REFERENCE NUMERALS

10: Ultrasonic-wave transmitter/receiver
21: Ultrasonic transducer
21a: Upper end surface of the ultrasonic transducer
22: Substrate
23, 92, 94: Piezoelectric element
80: Cable
41, 101, 102: Weight
44: Upper surface of the weight
50: Case
51: Upper case
51a: Lower end of the upper case
61: Lower case
64: Bottom of the lower case
65: Side wall of the lower case
68: Inner peripheral surface of the case
A1: Filler
A2: Cavity
A3: Upper surface of the filler

The invention claimed is:

1. An ultrasonic-wave transmitter/receiver for a fish finder, comprising:
    an ultrasonic transducer for transmitting and receiving ultrasonic waves;
    a bell-shaped case that houses the ultrasonic transducer; and
    a cable for suspending the case,
    wherein the case comprises an upper case and a lower case,
    wherein a cylindrical ultrasonic transducer, comprising a substrate that also serves as an acoustic matching layer and has a relatively large diameter, and a piezoelectric element bonded to the substrate and having a relatively small diameter, is positioned at the central bottom part of the lower case,
    wherein a ring-shaped weight made of a rigid metallic material is arranged in a gap between the inner peripheral surface of the lower case and the outer peripheral surface of the ultrasonic transducer to surround the ultrasonic transducer, such that its center of gravity aligns with the center of the lower case made of an elastic material,
    wherein the inner peripheral surface of the ring-shaped weight is positioned without contact with the outer peripheral surface of the piezoelectric element,
    wherein the gap in the lower region of the case is filled with a filler, and the ring-shaped weight is fixed to the case by the filler.

2. The ultrasonic-wave transmitter/receiver for a fish finder according to claim 1, wherein the upper surface of the ring-shaped weight is positioned lower than the upper end surface of the ultrasonic transducer.

3. The ultrasonic-wave transmitter/receiver for a fish finder according to claim 1, wherein the ring-shaped weight has a specific gravity equal to or greater than that of the piezoelectric element.

4. The ultrasonic-wave transmitter/receiver for a fish finder according to claim 1, wherein the filler is a cured product of a flowable resin.

5. The ultrasonic-wave transmitter/receiver for a fish finder according to claim 1,
    wherein the upper surface of the filler is positioned above both the joint interface between the lower case and the upper case and the upper end surface of the ultrasonic transducer, wherein a cavity is left in the region above the filler.

* * * * *